Aug. 8, 1933.  B. J. TAMARIN  1,921,438
CORD TAKE-UP STRUCTURE
Filed Oct. 9, 1928   6 Sheets-Sheet 1
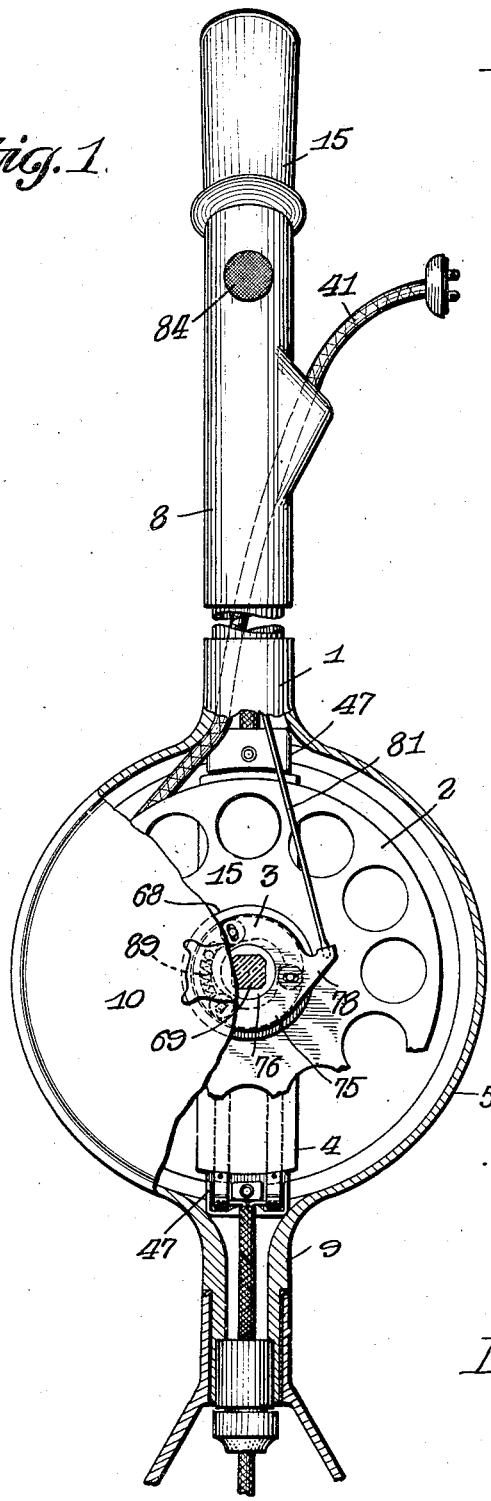
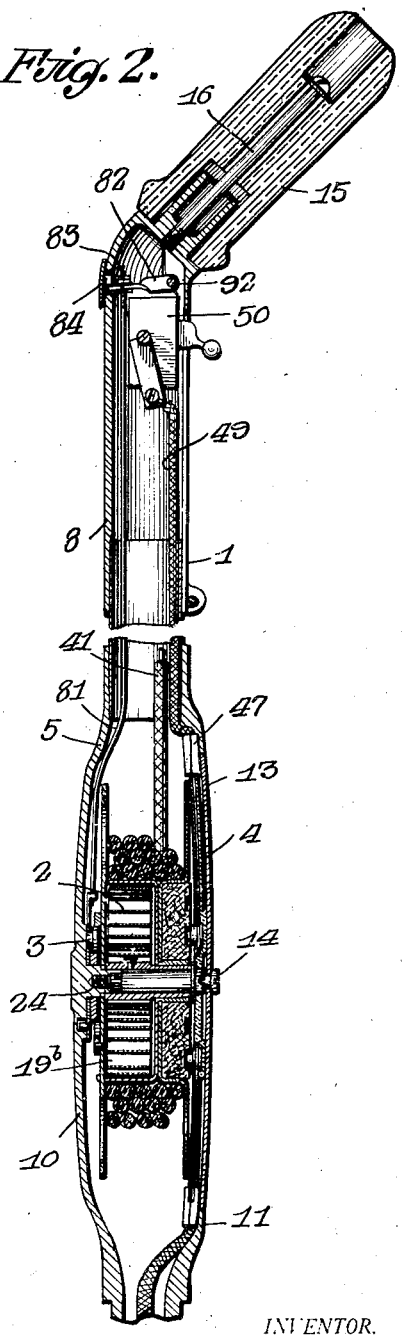
INVENTOR.
Bernard J. Tamarin
BY
Linton, Kellogg & Smith
ATTORNEY.

Aug. 8, 1933.   B. J. TAMARIN   1,921,438
CORD TAKE-UP STRUCTURE
Filed Oct. 9, 1928   6 Sheets-Sheet 2

INVENTOR.
Bernard J. Tamarin
BY

ATTORNEY.

Aug. 8, 1933.  B. J. TAMARIN  1,921,438
CORD TAKE-UP STRUCTURE
Filed Oct. 9, 1928  6 Sheets-Sheet 3
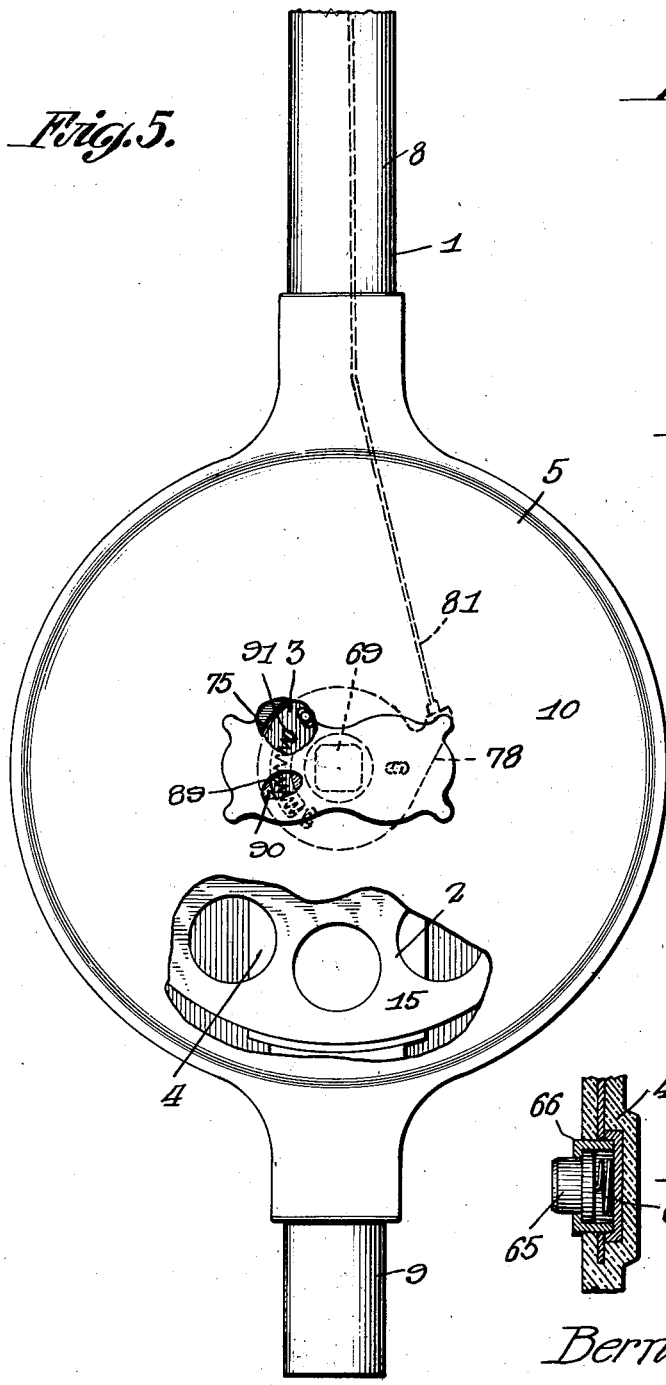
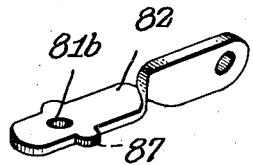
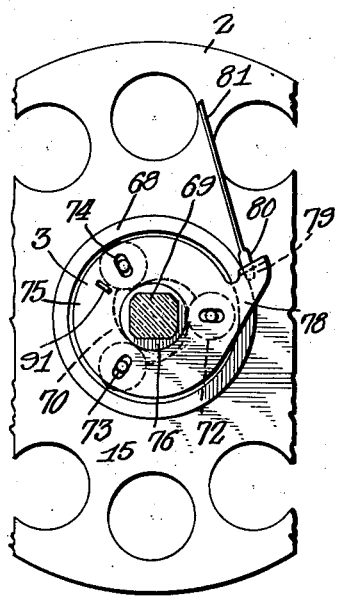
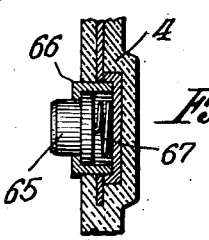
Inventor
Bernard J. Tamarin
By Linton, Kellogg + Smith
Attorneys Aug. 8, 1933.   B. J. TAMARIN   1,921,438
CORD TAKE-UP STRUCTURE
Filed Oct. 9, 1928   6 Sheets-Sheet 4
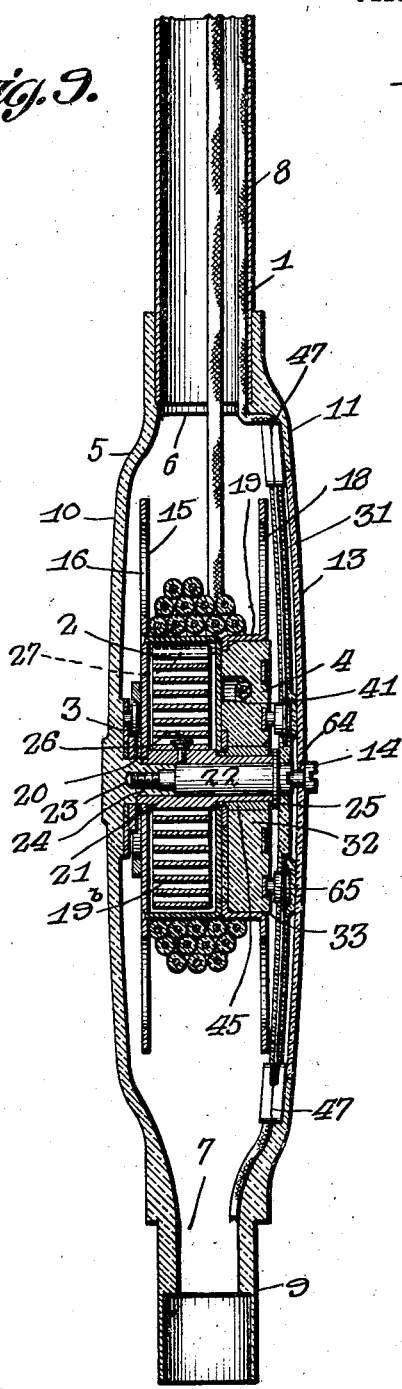
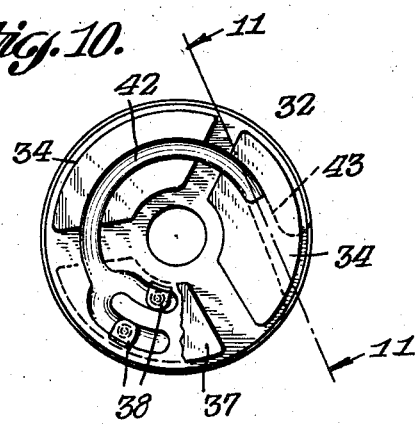
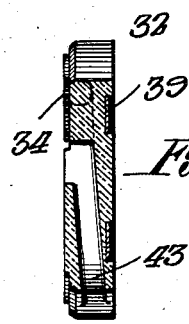
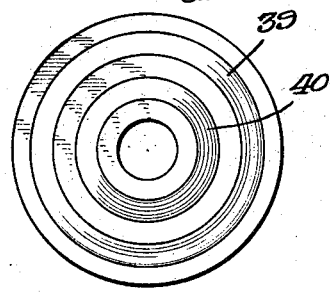
Inventor
Bernard J. Tamarin
By Linton, Kellogg & Smith,
Attorneys Aug. 8, 1933.   B. J. TAMARIN   1,921,438
CORD TAKE-UP STRUCTURE
Filed Oct. 9, 1928   6 Sheets-Sheet 5
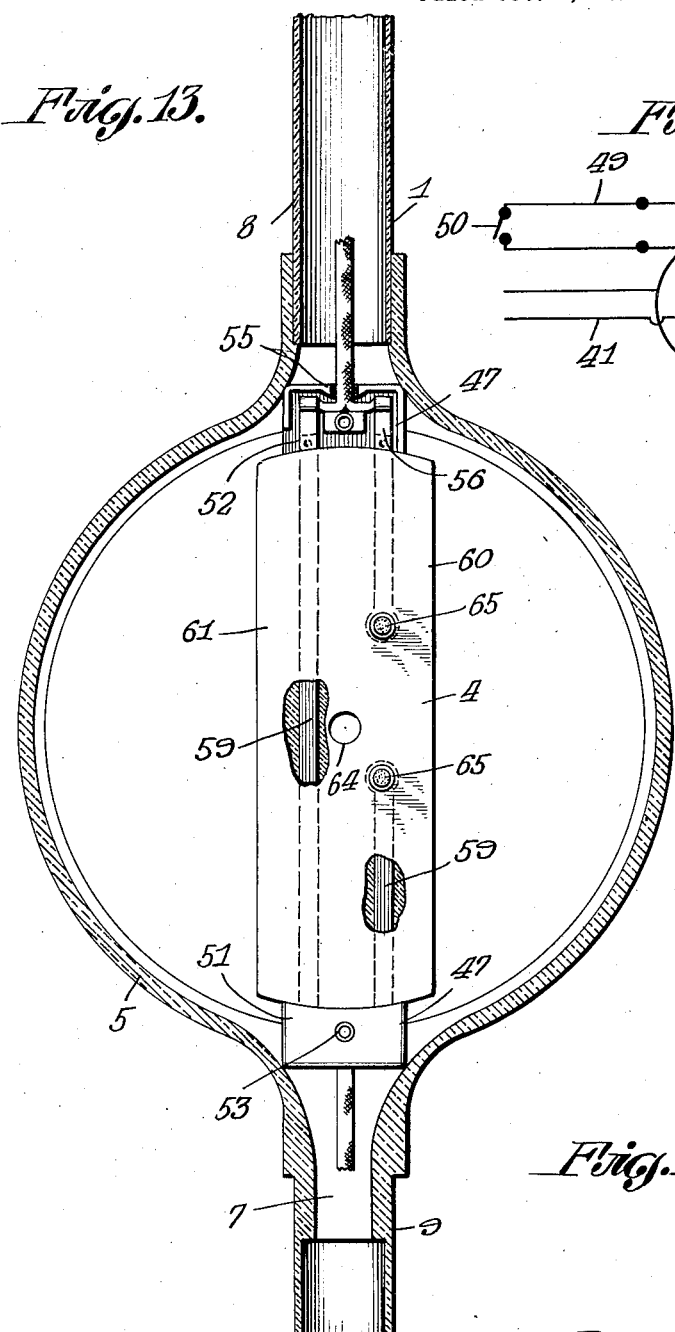
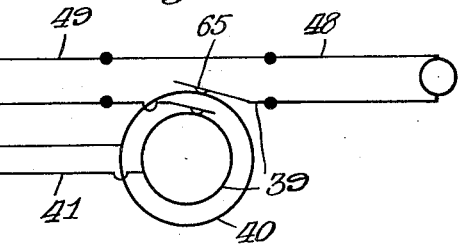
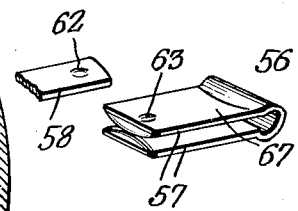
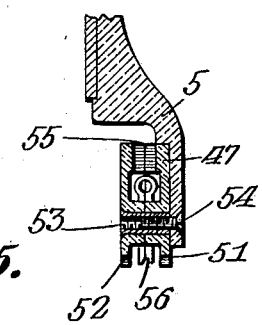
Inventor
Bernard J. Tamarin
By Linton, Kellogg & Smith,
Attorneys

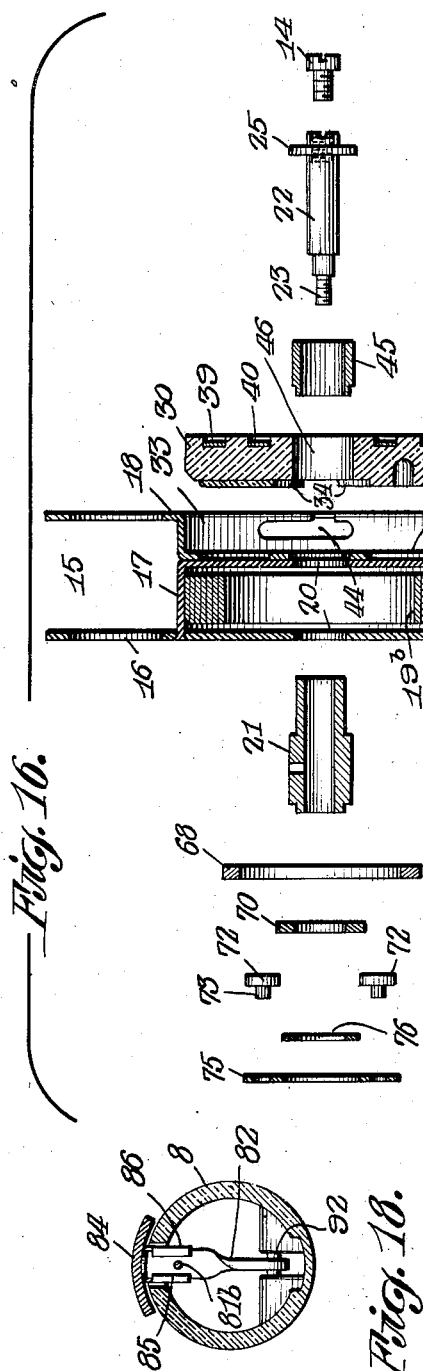

Patented Aug. 8, 1933

1,921,438

UNITED STATES PATENT OFFICE 1,921,438

CORD TAKE-UP STRUCTURE

Bernard J. Tamarin, Philadelphia, Pa.

Application October 9, 1928. Serial No. 311,377

5 Claims. (Cl. 242—107)

This invention relates to a cord take-up structure and more particularly to a take-up structure for the electric cord of a vacuum cleaning machine, and is in part a continuation of my copending application filed December 30th, 1927, Serial Number 243,694.

The primary object of the invention is the provision of improved structural features that collectively will enable the device to more effectively take care of all requirements during the use thereof and will resist wear or breakage over a long period of time.

An object of the invention is the design and corelation of the component parts which facilitate assemblage operations and besides enables the component parts to be economically manufactured.

Another object of the invention is the provision of a unique type of braking device which is practically fool proof and which will function accurately under all conditions.

Another object of the invention is the construction and novel arrangement of an improved type of commutator, whereby current may be readily conveyed to and from the reel structure in a manner to meet all commercial requirements.

A feature of the invention resides in the use of a multiplicity of braking elements capable of collective action for assuring a positive braking effect and the proper distribution of strains incidental thereto.

Another feature of the invention resides in the provision of a braking device having long life and one that includes a plurality of individual braking elements each capable of fully braking the movement of the reel.

Besides the above, my invention is distinguished in a design of commutator that may be easily arranged in place or removed; a reel structure that may be readily inserted and removed from the casing, and a braking device mounted independently and cofunctioning with the reel structure in a manner as not to be disturbed in the mounting or removing of the reel structure and the commutator.

Another exclusive feature of the present invention resides in the refinement of construction of the various parts that assures greater durability and lower production costs.

With these and other objects in view, the invention will be better understood from the following detailed description taken in connection with the accompanying drawings, wherein,—

Figure 1 is a front elevation of the device, partly in section.

Figure 2 is a vertical sectional view.

Figure 5 is an enlarged side elevation with portions of the casing broken away.

Figure 6 is a detail view of the braking device and associated parts.

Figure 7 is an enlarged sectional view of a portion of the commutator.

Figure 8 is a perspective view of the thumb lever.

Figure 9 is an enlarged vertical sectional view.

Figure 10 is a side elevation of the insulating block.

Figure 11 is a sectional view on line 11—11 of Figure 10.

Figure 12 is a side elevation of the insulating block illustrating the mounting of the rings.

Figure 13 is an enlarged sectional view through the casing, illustrating parts of the commutator.

Figure 14 is a sectional view of one of the contact clips.

Figure 15 is a detail sectional view of one of the contact devices.

Figure 16 is a diagrammatic view illustrating the manner in which the component parts of the reel structure are assembled.

Figure 17 is an enlarged sectional view of the brake device.

Figure 18 is a sectional view of the handle adjacent the remote control.

Figure 19 is a perspective view of the thumb element.

Figure 20 is a detail view of the brake cam.

Figure 21 is a diagrammatic view of the circuits.

Figures 3, 4:
Figure 3 is a side elevation with parts broken away illustrating part of the commutator in elevation.
Figure 4 is a vertical sectional view with the cover removed.

The present invention consists basically of a handle 1, a reel structure 2, a brake structure 3 and a commutator 4, all of which are so corelated as to produce a unitary device that may be very quickly connected to or disconnected from vacuum cleaning machines now on the market for the control of electric cords used therewith.

The handle 1 as clearly set forth and described in the above mentioned copending application consists of a casing 5 provided with an inlet 6 and an outlet 7, the former connected to the tubing 8 of the handle and the latter associated with a fitting 9 whereby the handle may be quickly and effectively secured to the socket of the head portion of the commercially known types of vacuum cleaning machines now on the market. The casing 5 is provided with a closed wall 10 and an open wall 11, the opening 12 of which is adapted to be closed by a removable cover plate 13. This cover plate is effectively held in place by a single locking screw 14 that is arranged in engagement with a portion of the reel structure 2, as hereinafter set forth. To complete the handle I provide a hand grip 15 of any suitable design preferably detachably secured to the tubing by a clamp element such as a bolt 16.

The reel structure 3 consists of a reel 15 produced from three stampings 16, 17 and 18, the stamping 16 in the form of a disk, and the stamping 18 of a disk shape formation provided with a centrally located depressed portion 19, arranged in abutting relation with and effectively secured to the stamping 17 that provides a housing 18 for the operating motor of the reel illustrated in this particular instance as a coil spring 19. Attention is called to the fact that the stampings 16, 17 and 18 are provided with alined openings 20 for receiving the hub member 21 upon which the reel is mounted for free rotation. Thus hub member 21 has a tight fit with a stub shaft 22 which in turn is provided with a screw 23 threaded into the stud 24 formed integral with and projecting from the closed wall of the casing. It will be noted that this shaft 22 is provided with a collar 25 that has an abutting relation with the end of the hub member 21 so that a binding engagement can be brought about between the hub member and the stub shaft to prevent rotating of the former, a necessary feature in view of the fact that the inner end of the spring 19 is fixed to the hub member as indicated at 26. The other end of the spring is fixed to a pin 27 carried by the reel proper and thus it can be appreciated that movement of the reel in one direction will tension the spring which will enable the spring to react in the opposite direction when the latter is released in a manner hereinafter described.

I now wish to call particular attention to a very important improvement incorporated in the construction of the hub member 21 and parts associated therewith. Referring to Figure 17 it will be noted that opposite surfaces of the stud 24 and hub member 21 are provided with ratchet teeth 28 cofunctioning to allow the hub member 21 to be turned in one direction relative to the stub shaft 22, but positively locking the hub member against movement in a reverse direction when the ratchet teeth are brought into locking engagement with each other. The free end portion of the hub member 21 is provided with notches 29 for the reception of an instrument or coin, as illustrated, whereby the hub member 21 may be given rotatable movements for varying the normal tension of the spring 19 and thus it can be appreciated that through a very simple adjustment the initial or normal resiliency of the spring can be changed to meet necessary requirements, and besides compensate for any spring fatigue that may take place over a long period of use.

My improved commutator 4 by means of which the electric current is effectively conveyed to and from the motor of the vacuum cleaner through the reel structure consists basically of a movable part 30 carried by the reel and a stationary portion 31 carried by the casing, the parts being so designed and corelated that they may be quickly arranged in assembled position with the assurity of perfect electrical connections. In this particular showing, the movable part 30 is in the form of an insulating block 32 snugly fitted within the recess 33 provided by the depressed portion 19 of the stamping 18. This insulating block 32, as clearly shown in Figures 10 and 11 is provided with arcuate projections 34 fitting within arcuate slots 35 provided in the depressed portion 19 which assures proper positioning of the insulating block and besides positively prevents displacement of the block during the use thereof. The depressed portion 19 is provided with a third slot corresponding to the shape of the slots 35 for the reception of an insulating insert 37 that effectively covers the clips 38 to prevent any tendency of these parts to spark or come into electrical connection with the metallic portions of the reel. The clips 38 extend from the contact rings 39 and 40 for establishing electrical connection between the contact rings and the ends of the conductor 41, the extreme end portion of which assuming an arcuate formation when seated in the arcuate groove 42 provided in the insulating block. Communicating with this groove 42 is an outlet 43 communicating with the peripheral surface of the insulating block and alining with the slot 44 in the reel for accommodating the passage of the conductor 41 to the reel proper. Particular attention is called to the fact that the connections between the clips and the ends of the conductor are protected from undue strain by the arcuate formation of the conductor which is of vital importance in the use of the device as the same is subject at times to very rough usage.

For the purpose of reducing friction to a minimum and to provide increased bearing surfaces I provide a collar 45 rotatably mounted on the hub member 21 and having a binding engagement with the walls of a bore 46 formed in the insulating block and one of the heretofore mentioned openings 20. Attention is called to the fact that the design and corelation of the stub shaft 22, hub member 21 and sleeve 45 is such that upon mounting of the stub shaft in place the collar 25 will hold the associated parts properly assembled, while, at the same time allowing free movements of the reel proper and the sleeve 45, and proper feed of lubricant from the spring compartment to the surfaces in movable contact. The stationary part of the commutator is of a very unique construction which facilitates the quick assemblage thereof and accuracy of connection which is a very important feature when taken in consideration with the fact that practically all assembling operations will be performed by unskilled labor.

Arranged in predetermined positions relative to the opening 12 is a pair of contact devices 47 forming the terminals for the motor circuit 48 and the switch circuit 49 in which is arranged the switch 50. Each contact device is of a design to provide an upper section 51 and a lower section 52 of insulating material such as bakelite and these sections are effectively secured together by an eyelet 53 that is threaded to have proper engagement with the attaching screw 54 mounted in the casing 5. These sections cooperate to provide a serrated inlet 55 for clamping engagement with the end of the conductor passing into the device for the making of the proper connections with the contact clip 56. This contact clip 56 is of U-shaped formation to give the required resiliency to the curved contact fingers 57 arranged in parallel relation so as to allow the passage therebetween of the exposed terminals 58 of the mechanic strips 59 that are embedded in an insulating body 60 to form the connector 61. To assure a more effective engagement between the exposed terminals 58 and the contact clips carried by the contact devices, the clips may be provided with projections 62 for snapping engagement into openings 63 formed in the upper limbs 67. This snapping engagement assures proper positioning of the connector 61 and serves as an indication to the assembler that the connection has been properly made. For the purpose of facilitating this particular assemblage operation, the connector 61 is provided with a centrally located hole 64, the wall of which is rotatably mounted on the free end of the stub shaft 22 so that the connector may be rotated about the stub shaft for swinging the exposed terminals 58 mechanically into proper interlocking perfect electrical connection with the contact devices. I wish to call particular attention to the fact that the design, corelation and relative movement between the parts just mentioned is such that a perfect electric connection is assured with very little effort. Referring to Figure 7 it will be noted that the brushes engaging the contact rings are in the form of plungers 65 slidably mounted in holders 66 that are inserted in the insulating body and electrically connected to the conducting strips 59 carried thereby. As these plungers are spring pressed, as indicated at 67, it will be appreciated that perfect wiping contact is provided and wear automatically compensated for which is an important feature in view of the long life of the device.

The brake structure 3, a very important part of the present invention, is of a design that wear is reduced to a minimum and the strains incidental to the use thereof equally distributed so as to be properly taken care of in the use of the cord take-up structure. This brake structure in one of its many forms consists basically of a plurality of braking elements mounted for movement in predetermined directions so as to have a braking and nonbraking engagement with the reel and associated with a movable supporting element capable of remote control whereby the braking elements collectively may be moved in to and out of operative position. To accomplish this desired result, the brake structure consists of a track 68 in the form of a ring of a hardened construction and fixed to the side of the reel as clearly shown in the enlarged sectional view, Figure 17. The stud 24 is provided with a squared portion 69 upon which is removably mounted a cam member 70 provided with a plurality of cam portions 71 operatively related with a corresponding number of brake elements illustrated as rollers 72, the bearing pins 73 of which are mounted in elongated bearing openings 74 in a cage 75. This cage is mounted on a hardened bearing ring 76 that is in turn fixed against rotation upon the squared portion 69 of the stud. Due to the elongation of the bearing openings 74 the rollers 72 have a limited radial movement for enabling the cam portion 71 of the cam to force the rollers 72 into and out of braking relation with the inner peripheral surface of the track 68 which enables the accurate control of the movements of the reel. The cage 75 as clearly shown in Figure 6 is provided with a finger 78 in which is arranged a pocket 79 providing a seat for the flattened end 80 of the actuated rod 81. The other end of the rod 81 is threaded and passed through a hole 81b, of the lever 82 so as to have mounted thereon the clamp nuts 83 for effectively securing the rod to the control lever 82. The thumb piece 84, the remaining element of the remote control, is secured to a clip 85 that is of U-shaped formation to provide the parallel limbs 86 of a shape to have a sliding fit with the edge portions of the lever 82 to bring about an interlocking engagement between the lugs 87 carried by the lever and the openings 88 in the limbs 86. Thus, it will be appreciated that the thumb piece may be readily brought into interlocking engagement with the lever 82 for the assemblage of the parts which also enables a quick disconnection of the thumb piece from the lever to allow proper adjustment of the nuts 83 for accommodating adjustment of the rod 81. To complete the brake structure I provide a release spring 89 mounted in an arcuate recess 90 in the inner surface of the wall of the casing so that one end of the spring may abut the end wall of the recess and the other end abut the pin or projection 91 carried by the cage 75. As the lever 82 is mounted on a pivot pin 92 carried by the tubing it will be appreciated that pressure upon the thumb piece 84 will give rectilinear movements to the rod 81 for swinging the cage in a direction opposing the resiliency of the spring 89 which action retracts the braking elements out of braking engagement with the reel for allowing the same to function to wrap the cord therearound. Attention is called to the simplified design and corelation of the component parts of the braking structure which enables the same to be very quickly arranged in assembled relation upon the stud in a manner as not to disturb the insertion and removal of the reel structure.

In the assemblage of the complete device, the reel proper is first assembled by bringing the various stampings into proper relation and securing the same together by any of the well known methods utilized in quantity production. Previous to the securing of the stamping 16 to the stamping 17, the coil spring with the hub member 21 attached thereto is arranged within the stamping 17 with the ends of the hub member properly passed through the openings 20 of the various stampings. Due to the fact that the inner end of the spring is effectively secured to the hub member and the outer end of the spring is secured to a pin carried by the stamping 17, it will be appreciated that relative movement between the stampings and the hub member will tension the spring. Upon the formation of the reel as just set forth, the insulating block with the sleeve 45 assembled therewith is mounted on the protruding end of the hub member so as to be properly seated within the recess of the depressed portion 19. In the seating of the insulating block, the projections 34 thereof are forced into the arcuate slots 35, thereby assuring proper positioning of the insulating block and the positive retention thereof against displacement.

As the component parts of the reel structure have now been properly assembled, I will consider the assemblage operations necessary to properly mount the brake structure. It has been heretofore stated that the stud 24 is provided with a squared portion for receiving the bearing ring 76, and cam 70 which positively holds these elements against rotatable movement but allows the same to be readily removed by rectilinear movement longitudinally of the stud 24. The cage 75 is directly mounted upon the bearing ring 76 and this cage directly receives the rollers 72 that are positioned between the cam and the track 68 directly riveted to the side of the reel. Previous to the mounting of the cage upon the bearing ring 76 the spring 89 has been arranged in place to have abutting relation with the projection of the cage as the same is mounted upon the ring 76. To complete the assembling operation, the end of the rod is mounted in the finger 78 of the cage and properly connected with the lever 82. When this has taken place, it is a very simple operation to force the thumb piece member onto the lever for completing the brake structure.

The final operation consists in passing the stub shaft through the hub member 21 and screw threading to the stud 24 which brings about a binding engagement between the stub shaft and the stud and a locking arrangement between the stub shaft and the stud and a locking arrangement of the hub member due to the arrangement of the collar 25. It will now be appreciated that removal of the stub shaft will enable the reel structure as a unit to be readily removed from the casing without disturbing the assembled formation of the elements of the brake structure which will enable any required repairs to be made to the reel structure without the necessity of readjusting the parts of the brake structure. With the reel structure and the brake structure properly assembled it is a very simple operation to mount the connector upon the stub shaft and give the same a partial turn for swinging the exposed terminals into proper interlocking electrical connection with the contact devices 47. As the brushes carried by the connector have a fixed relation with the axis of the stub shaft it will be appreciated that the proper alining of the brushes with the contact rings is assured. The cover plate 13 is now arranged in place with the screw 14 mounted in the end of the stub shaft for locking the cover plate in position. The electric cord is mounted in a manner well known in this particular art, although I wish to stress the fact that an end portion of the cord is given an arcuate formation at the point of connection with the insulating block so as to relieve the clips 38 of undue strain, and the other end portion drawn from the reel and through the tube to initially tension the spring of the reel.

In the operation of the device, the hand engaging the hand grip is utilized to manipulate the thumb piece 84 for the rendering of the brake device active and inactive, which action regulates the rotatable movements of the reel and the movement of the cord to and from the reel structure. In this particular case, manipulation of the thumb piece 84 moves the cage against the action of the spring into a position to destroy the binding engagement between the cam elements and the track, thereby enabling the spring to freely function to rotate the reel for the winding of the cord thereupon. When the required amount of cord has been wound upon the reel the thumb piece 34 is released, which instantly stops further rotation of the reel due to the novel type of brake device utilized which incorporates in its structure a plurality of braking elements, each of which has an independent braking action with the reel structure. Referring to Figure 6, it will be noted that when the cage is moved in a predetermined direction, the rollers will ride upon the cam surfaces of the cam elements which displaces the rollers relative to the axis of the stud, thereby bringing about a binding engagement between the cam surfaces and the interior peripheral surfaces of the track for the instant stoppage of further movement of the reel. Movement of the cage in a reverse direction will disengage the rollers from a binding engagement with the reel structure to enable the latter to rotate the required amount to properly wrap the cord upon the reel.

In concluding, I wish to lay considerable stress upon the simplified design of the component parts and their manner of association, which not only materially reduces production costs but assures perfect electrical connection and a positive elimination of all tendency of parts to spark. It will of course, be understood that structural changes can be made to meet specific manufacturing requirements without departing from the spirit of the invention and therefore, I do not wish to be limited in protection in any manner whatsoever except as set forth in the following claims.

I claim:

1. A cord take-up structure comprising a casing, a stub shaft removably supported by said casing, a hub member detachably mounted on said stub shaft, a reel rotatably mounted on said hub member, an operating spring for said reel having its ends connected respectively to the reel and to said hub member and a remote control device having a fixed relation with said hub member and including a group of braking elements capable of movement into and out of binding engagement with said reel.

2. A take-up structure for the electric cord of a vacuum cleaning machine comprising a casing having an interiorly arranged stud, a stub shaft detachably connected to said stud, a hub member supported on said stub shaft and said stud, and fixed thereto, a reel rotatably mounted on said hub member, a spring having one end connected to the reel and the other end to the hub member, a ring fixed to the casing, a cam fixed to the said stud, a plurality of braking elements mounted to be moved into braking engagement with the ring through the action of said cam, and a remote control for moving said elements relative to said cam.

3. A cord take up structure comprising a casing having one wall closed and its opposite wall provided with an opening, a stub projecting from the closed wall, a hub member mounted on the stub and capable of adjustments therearound, a brake device mounted on said stub and a reel structure removably mounted on the hub member and under the control of said brake and including a spring having one end connected to the hub member whereby the tension of the spring may be regulated by adjusting the hub member relative to said stub and a stub shaft adapted to be slipped through said hub member and attached to said stub.

4. A cord take up structure comprising a casing having one wall closed and its opposite wall provided with an opening, a stub projecting from the closed wall, a hub member mounted on the stub and capable of adjustments therearound, a brake device mounted on said stub and a reel structure removably mounted on the hub member and under the control of said brake and including a spring having one end connected to the hub member whereby the tension of the spring may be regulated by adjusting the hub member relative to said stub and a stub shaft adapted to be slipped through said hub member and attached to said stub, a closure plate for said opening and means associated with the end of the stub shaft for locking said reel structure in place and for securing said closure plate in place.

5. A cord take up structure comprising a casing, a stub projecting from the interior of the casing, a hub member having a ratchet connection with said stub, a brake having a sliding attaching connection with said stub, a reel structure having a sliding attaching connection with said hub member for movement into proper relation with said brake, a stub shaft slid through said hub member and provided with a collar having an abutting relation with said reel structure to prevent displacement thereof, said reel structure including a spring having one end connected to the hub member whereby the tension of the spring may be adjusted by adjusting the hub member through its ratchet connection with said stub.

BERNARD J. TAMARIN.